United States Patent [19]
Sobole

[11] 4,321,071
[45] Mar. 23, 1982

[54] FILTER FOR REMOVING DUST FROM A GASEOUS FLUID

[75] Inventor: Jean Claude Sobole, Ruffey les Echirey, France

[73] Assignee: Societe Bourguignonne de Mecanique, France

[21] Appl. No.: 138,301

[22] Filed: Apr. 8, 1980

[30] Foreign Application Priority Data

Apr. 10, 1979 [FR] France .................... 79 09025

[51] Int. Cl.³ ............................................. B01D 50/00
[52] U.S. Cl. ............................. 55/320; 55/DIG. 20; 55/464; 110/217
[58] Field of Search ......... 55/321, 330, 337, DIG. 20, 55/464, 320; 110/119, 216, 217

[56] References Cited

U.S. PATENT DOCUMENTS

| 1,891,069 | 12/1932 | Suciu ........................ 110/217 |
| 3,884,655 | 5/1975 | Coop .......................... 55/DIG. 20 |
| 4,205,971 | 6/1980 | Abthoff et al. ................. 55/337 |

FOREIGN PATENT DOCUMENTS 730175 12/1942 Fed. Rep. of Germany ........ 55/337
918043 8/1954 Fed. Rep. of Germany ........ 55/330

*Primary Examiner*—David L. Lacey
*Attorney, Agent, or Firm*—Robert E. Burns; Emmanuel J. Lobato; Bruce L. Adams

[57] ABSTRACT

A filter for removing dust and solid particles from a gaseous fluid, such as air, comprises a case having opposite side walls which are symmetrical about a vertical plane. In each side wall there are inlet openings which open into inlet passages defined by inclined baffles which slope inwardly and upwardly to the outer face of filter material contained in the case and having spaced portions, one against each side wall of the case, with a cavity between them in communication with an outlet at the bottom of the case. Air first flows through those sections of the filter material providing the shorter paths defined by the baffles in flowing from the inlet openings to the outlet. As those sections become clogged with dust particles, air flows through adjacent sections so that the useful life of the filter is extended.

10 Claims, 3 Drawing Figures

FIG. 1
FIG. 3
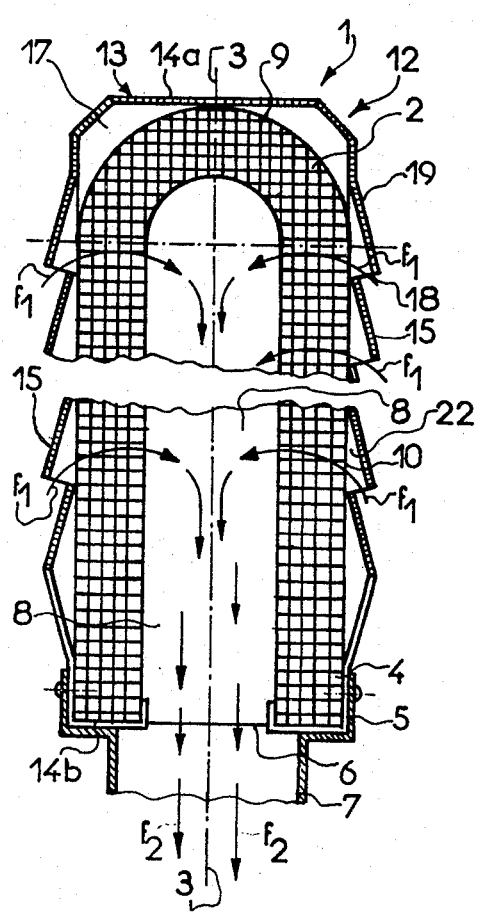
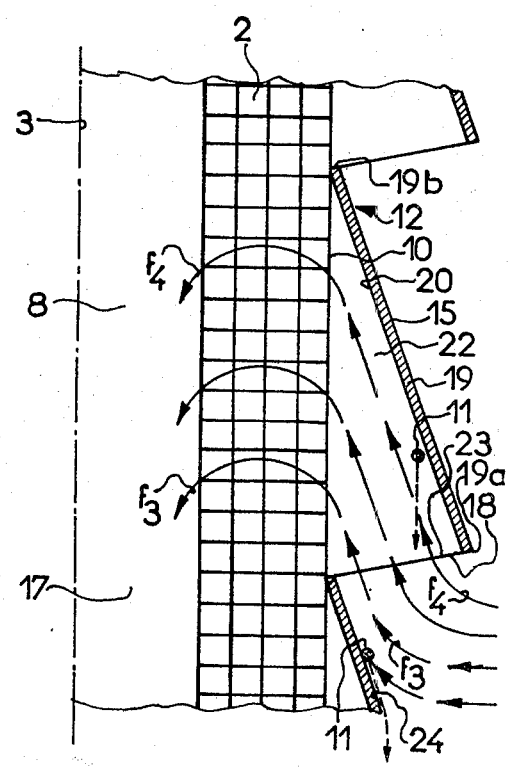

FILTER FOR REMOVING DUST FROM A GASEOUS FLUID

BACKGROUND OF THE INVENTION

1. Field of the Invention

The present invention relates to improvements in filter means for removing dust from a gaseous fluid, notably air.

2. Description of the Prior Art

Filter means or precipitators for removing dust from gaseous fluids, notably air, are already known and comprise as a rule filter elements having specific physical properties, associated with a load apparatus. The gaseous fluid containing solid particles or dust to be eliminated, which is to be fed to this apparatus, is forced through the filter element in which the finer particles in particular are retained. Generally, the coarser particles cannot pass through this filter element and are stopped by its outer surfaces, so that in most instances they clog the filter element well before its actual capacity of retaining the other, finer particles are fully exploited. On the other hand, it is known that with filter means of the type broadly mentioned hereinabove a kind of compromise is aimed at since two essential parameters are kept into account, namely on the one hand the surface area of the filter element which is subordinate to the total amount of solid particles likely to be "stored" potentially by this filter element, and on the other hand the velocity of penetration at which these particles pass through the filter element, this speed being subordinate to the capacity of these particles to penetrate into the filter material and consequently to the actual degree of utilization of the filter element, through its whole thickness. Now, in known filters of the above-mentioned type and for a given filtrated gaseous fluid throughout, this necessary compromise is generally scarcely obtained, either because it favors the filter surface area, with the twofold inconvenience of excessive over-all dimensions and a reduction in the penetration speed, resulting in a poor exploitation of the filter through its whole thickness, or because it favors the penetration speed, and in this case the total amount of solid particles that can be stored in the filter element remains relatively low. Thus, in any case, the filter is not utilized to its maximum capacity and/or its useful life is abnormally short, with all the inconveniences resulting from these unfavorable conditions.

SUMMARY OF THE INVENTION

It is the primary object of the present invention to avoid the various inconveniences mentioned hereinabove by providing a filter structure for removing dust and other solid particles from a gaseous fluid, notably air, this structure comprising means for retaining the finest particles carried by the fluid to be filtered, and in combination therewith means for stopping the coarser particles in order to remove them from the gaseous fluid to be filtered before they reach the outer surface of the means provided for retaining the finer particles, this filter structure being characterized in that the coarse particle stopping means also act, in combination with the retaining means, as baffle means capable of creating a gradient of the velocity of penetration of the gaseous fluid to be filtered into the retaining means, in order to form preferential paths for the fluid through the filter material, said paths and consequently the various filtration areas being caused to become operative sectorially and successively, varying progressively with time, thus increasing the useful life of the filter structure and ensuring a thorough, more economical utilization thereof.

It will be seen that the improvements according to this invention are applicable to a conventional filter structure known per se, of the type broadly set forth hereinabove. With the improvements according to the instant invention, successive sections of the filter material are clogged by turns, and each section when clogged or exploited optimally and completely is abandoned, so that the useful life of the complete filter structure is extended considerably and the filter structure itself is utilized to its best. On the other hand, the rigidity and mechanical protection of the filter material proper are advantageously enhanced by the improvements brought by the present invention.

A clearer understanding of the invention will be had as the following description of a preferred form of embodiment thereof proceeds with reference to the attached drawing.

BRIEF DESCRIPTION OF THE DRAWINGS

FIG. 1 is a diagrammatical section taken in an axial plane along the line I—I of FIG. 2, showing a typical form of embodiment of the filter structure of this invention, with parts broken away;

FIG. 3 is a diagrammatical view showing on a larger scale details of the improved filter structure of this invention.

DESCRIPTION OF THE PREFERRED EMBODIMENT

Figure 2:
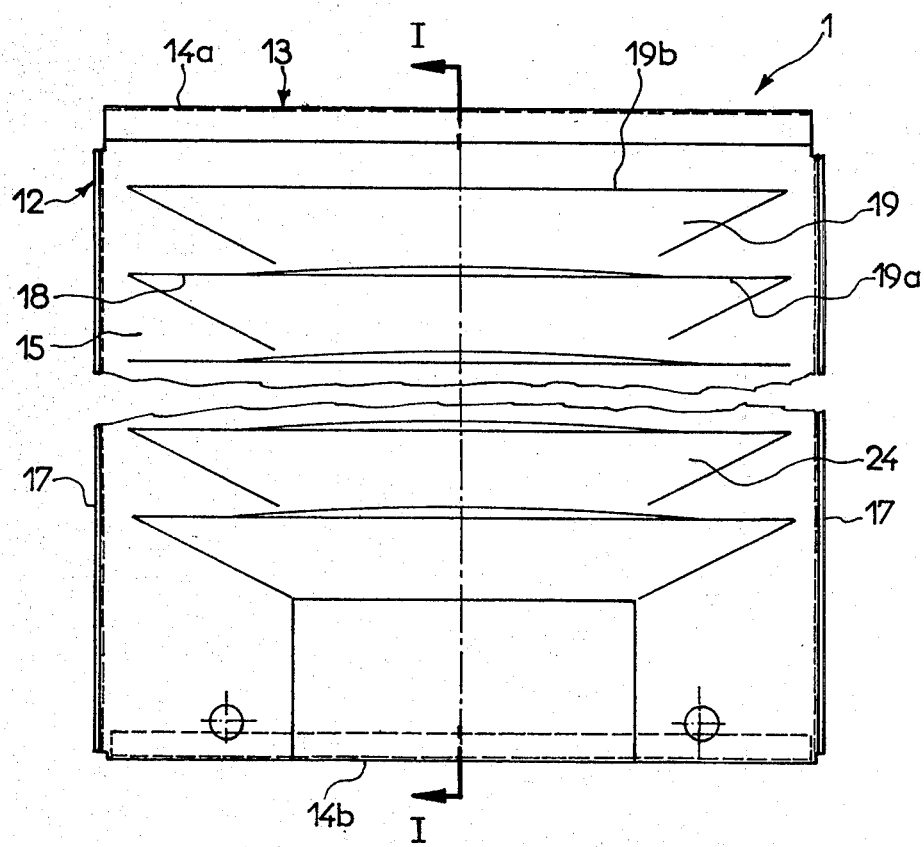
FIG. 2 is a diagrammatical, part-sectional view of the filter structure of the invention, with parts broken away.

The filter structure 1 according to this invention for cleaning gaseous fluids, notably air, comprises filter material for retaining notably the finest solid particles, or dust, carried along by the gaseous fluid to be filtered, and having specific properties (surface area, thickness, texture, etc.) for example a porous material of adequate thickness, notably textile material or plastics, having preferably a flexibility sufficient to permit the bending thereof to a shape (as seen in cross-section, corresponding to the plane of FIG. 1) containing a vertical or substantially vertical longitudinal axis 3 and having notably the shape of an inverted U, and, in elevation (corresponding to a plane perpendicular to that of FIG. 1), a generally flat, rectangular shape, with the vertical arms of the inverted U having their lower free ends 4 secured to a suitable casing 5 of a support member (not shown or described, since it is no part of the invention), which is provided with a lower central outlet aperture 6 for the filtered gaseous fluid, said casing 5 being secured by suitable and known means to the filtered air inlet, notably a conduit 7, of the load apparatus utilizing the cleaned gaseous fluid, for instance a gas burner.

Of course, the filter material 2 may be manufactured, shaped and assembled in many other ways without departing from the invention. Thus, this filter material 2 may comprise only two longitudinal strips of filter material, the filter proper being closed completely both laterally and at its top. The filter material 2 provides an internal, central, axial and substantially vertical cavity 8 for the filtered gaseous fluid which communicates with the load apparatus only through the lower central outlet aperture 6 and is bound firstly on the one hand longitudinally and in elevation on both sides and on the other hand at its top 9 corresponding to the free upper end of the filter structure by the filter material proper 2, and secondly laterally (i.e. parallel to the plane of FIG. 1) and on either side by the filter material 2 (comprising in this case lateral inturned portions provided for this purpose) and/or a closing plate or flange. Therefore, the only possible communication between the external medium from which the gaseous fluid to be filtered is drawn and the central cavity 8, respectively the load apparatus, is through the filter material 2. Sealing and/or closing means (not shown) are provided, if necessary, and suitably fitted at the proper locations of the filter structure (for example at the junction between the filter material 2 and the supporting member).

The gaseous fluid to be filtered is drawn from the surrounding atmosphere or medium and directed firstly against the filter material 2, notably the outer surface 10 thereof, which is substantially flat, and extends longitudinally and vertically. The fluid then flows through the filter material 2. Thus, a fluid stream is formed as shown diagrammatically by the curved arrows $f_1$ (having their concavity directed downwards, as shown in FIG. 1), so as to flow eventually downwardly and substantially vertically along the cavity 8. The particles in suspension in the gaseous fluid are retained or stopped, at least as far as the finest ones are concerned, by the filter material 2, according to the specific properties of this material and the throughout of gaseous fluid to be treated, i.e. the velocity of penetration of the gaseous fluid to be treated into the filter material 2. Thus, the dust is removed from the gaseous fluid and the cleaned gaseous fluid penetrates into the central cavity 8, flows down through the outlet aperture 6 and is delivered into the conduit 7 for feeding the load apparatus (see arrow $f_2$).

However, also coarser solid particles or dust are conveyed by the gaseous fluid to be filtered, as shown diagrammatically at 11 (FIG. 3), and since these heavier particles cannot pass through the filter material 2, considering the specific physical properties thereof, they would tend naturally to accumulate on the outer surface 10 of the filter material 2 and clog the complete filter structure if the improved means 12 of this invention were not provided. It is the primary object of these improved means 12 to stop these coarser particles, notably in combination with the filter material 2.

According to a first exemplary form of embodiment of the invention, these means 12 comprise: a case or housing 13 adapted to fit externally on the filter material 2 and having a general configuration which is complementary of the external shape of said filter material 2, this case 13 comprising a first imperforated, notably substantially horizontal, top plate 14a, disposed at least in close vicinity of, and preferably in contact with the top 9 of the filter material 2; an open bottom 14b, in close vicinity of, and preferably in contact with, the base 4, fitting for example in the casing 5 and cooperating with the support member (not shown); a pair of vertical longitudinal walls 15 disposed on either side and cooperating, as will be explained presently, with the filter material 2, notably the vertical arms thereof, and more particularly with its outer surface 10; and on either side vertical end walls 17 rigidly connected to said top and bottom walls 14a, 14b and also to the walls 15 which may be flat, in close vicinity of, and preferably in close contact with the filter material 2 and/or the closing plate.

The longitudinal walls 15 and possibly the lateral end walls 17 (especially if no closing plates are provided) comprise at least one and preferably a plurality of substantially horizontal, transversely extending louvre-forming slots or apertures 18 between said end walls 17, each slot 18 being inclined to an acute angle of the order of, say, 90° in relation to the outer surface 10 of the filter material 2. Preferably, the apertures 18 are substantially parallel to one another and formed at vertically spaced intervals, each aperture 18 registering with predetermined section of said outer surface 10. According to a specific feature characterizing this invention, the area of each aperture 18 is at the most equal to the corresponding outer surface area of the corresponding section of the filter material 2. Preferably, the area of each aperture 18 is only one fraction for example one half or one third of the corresponding area of the outer surface 10 of filter material 2. Also preferably, each aperture 18 is slightly inclined upwardly and outwardly to the horizontal, for example by 10°.

Furthermore, said apertures 18 are obtained and limited for example by baffle plates 19 set at a relatively large angle to the horizontal and to an acute angle of about 10° to the vertical. Said plates 19 extend upwardly and inwardly in relation to the filter material 2 and are adjacent to one another, the lower horizontal edge 19a of one baffle plate 19 lying in a horizontal plane at least substantially coplanar with, or in close vicinity of, the horizontal plane of the upper horizontal edge 19b of the next baffle plate 19 beneath. These baffle plates 19 and apertures 18 are obtained for example by cutting or stamping initially flat sheet metal elements, but any other suitable manufacturing method may be adopted, if desired. The outer surface 10 of filter material 2 engages, or extends, at least in close vicinity of, these baffle plates 19, notably of their upper horizontal edges 19b. With this arrangement a plurality of free spaces 22 having a substantially triangular or inverted V configuration in vertical cross section (i.e. in the plane of the U-shaped section of the filter material, corresponding to the planes of FIGS. 1 and 2), are formed, each space 22 opening at its lower side 23 merging with the aperture 18, with one side corresponding to the outer surface 10, of the filter material and the other side corresponding to one baffle plate 19, the acute vertex corresponding to the top edge 19b of this plate 19. The cross-section of this space 22, parallel to the lower side 23, tapers regularly away from side 23 and towards the edge 19b of the relevant plate, along the outer surface 10 of filter material 2.

OPERATION

The gaseous fluid to be filtered, loaded with solid or dust particles to be removed and fed from the surrounding medium can reach the filter only by penetrating into the free spaces 22 through the corresponding free gaps 18, before striking the outer surface 10 of the filter material 2 as shown by the arrows f. Due to the inclined position of these apertures 18, the gaseous fluid must necessarily follow a curved deflected path, notably a path which is firstly substantially horizontal, for example in the external medium, then inclined, upwardly and inwardly in each gap 22, then substantially horizontally and more or less curved with a downwardly-directed concavity through the filter material proper 2, and finally vertically downwards in the central cavity 8. During this path, and more particularly at the end of the initial portion thereof, the gaseous fluid strikes, and is deflected by the outer surface 24 of each baffle plate 19, so that its direction of travel is more or less modified at this location or in this area. The particles entrained by the gaseous fluid to be filtered and more particularly but not exclusively the coarser particles 11, having a greater mass, are stopped by the baffle plates 19, notably by their outer faces 24 and subsidiary by their inner faces 20. These coarser particles can strike the outer faces 24 and possibly accumulate more or less thereon. Preferably, the adhesiveness of the outer faces 24 and possibly the inner face 20 with respect to the particles is eliminated or at least reduced considerably, notably by the fact that the case or housing 13 is made from extremely smooth material, such as stainless steel. The particles 11 possibly accumulated on these plates 19 eventually slip thereon and finally fall simply by gravity out from the free spaces 22, before reaching the outer surface 10 of filter material 2, thus efficiently protecting this material 2 against any premature clogging. The stopping of these solid particles 11 may if desired by reinforced within each free space 22 as a consequence of turbulence or other effects likely to develop therein, notably in the vicinity of the inner face 20 and/or of the edges 19b.

The baffle action exerted by plates 19 will be better understood if reference is made to FIG. 3. The length of the path followed by the streams of gaseous fluid from an aperture 18 to the corresponding outer surface 10 of the filter material 2 increases gradually from said aperture 18 to successive points of said surface 10 in the vertical upward direction, therefore between streams such as those shown diagrammatically by the arrows $f_3$ and $f_4$. On the other hand, the difference in surface areas between the apertures 18 and the outer surface 10 produces a gradient in the velocity of penetration of the gaseous fluid and consequently a higher speed in certain sections, notably those corresponding to paths such as the one designated diagrammatically by the arrow $f_3$ and the adjacent paths.

When the filter material 2 is not clogged it is observed that the gaseous fluid and the solid particles and dust entrained thereby, notably the finest ones, penetrates into the filter material 2, preferably and firstly along paths such as those shown by the arrows $f_3$ and adjacent paths where the penetration velocity has its maximum value. In this case, the relevant section of filter material 2 is active, fully utilized and has its maximum efficiency inasmuch as the velocity of penetration has thus been increased all other parameters remaining unchanged. Thus, the particles to be removed from the gaseous flow are essentially filtered, stopped and stored in this section. In contrast thereto, the paths such as those designated by the arrow $f_4$ and adjacent ones are relatively passive and less utilized during this initial period of use of the filter material, so that they collect less solid particles than the lower portion of the lower section. Subsequently, the particles accumulate in the more utilized portion of the filter material, until this portion is choked in turn. It is then the less choked portion of the filter material in which the highest velocity of penetration prevails, that becomes essentially active, and so forth. Thus, the filter material is implemented sectorially and this gradual rise of the gaseous flow through the filter varies progressively with time, due to the velocity gradient thus created, which increases considerably the useful life and also the efficiency of the filter.

It is also obvious that the case or housing 13 constitutes at the same time an efficient means for protecting the filter material 2 not only against shocks but also against the undesired accumulation of dust therein when the filter is inoperative.

Of course, many modifications and changes may be brought to the specific form of embodiment shown and described herein by way of example without departing however from the basic principles of the invention as set forth in the appended claims.

What is claimed as new is:

1. A filter for removing dust from a gaseous fluid such as air, comprising a case having a side wall with fluid inlet means in said side wall, and an outlet, filter means in said case between said inlet means and said outlet so that, in passing from said inlet means to said outlet, fluid must pass through said filter means, said filter means having an outer face facing said side wall;
    said fluid inlet means comprising inclined baffle plates defining inlet openings of said case disposed at approximately 90° to said outer face of said filter means, and inlet passages leading from said inlet openings to said outer face of said filter means, said inlet passages being inclined at an acute angle to said outer face of said filter means in a direction away from said outlet,
    whereby fluid being filtered initially passes through a first section of said filter medium which provides the shortest path from said inlet openings to said outlet and, as this section becomes clogged with retained dust, said fluid passes through an adjacent section of said filter means.

2. A filter according to claim 1, in which said side wall of said case is approximately vertical, and in which said outlet opening is at the bottom of said case, said inlet passages defined by said baffle plates sloping inwardly and upwardly from said inlet openings to said filter means.

3. A filter according to claim 2, in which said baffle plates are formed out of said side wall of said case and are inclined to the outer face of said filter means.

4. A filter according to claim 3, in which said baffle plates are inclined at an angle of about 10° to the outer face of said filter means.

5. A filter according to claim 3, in which said baffle plates are of sheet material having a smooth surface, whereby dust particles accumulated on said baffle plates eventually slide off.

6. A filter according to claim 3, in which a plurality of said baffle plates are disposed one above another and are arranged with the upper edge of a lower baffle plate substantially coplanar with the lower edge of the next higher baffle plate.

7. A filter according to claim 1, in which the area of each said inlet openings is between one third and one half the area of that portion of the outer face of said filter means to which the inlet passage of said inlet opening leads.

8. A filter according to claim 5, in which said inlet openings are disposed at an angle slightly less than 90° to the outer face of said filter means.

9. A filter according to claim 1, in which said case has an imperforate top and a second like side wall opposite said aforementioned side wall and symmetrical therewith with respect to a central vertical plane, with said inlet means in each of said side walls, said outlet opening being at the bottom of said case, and said filter means having two portions lying respectively against said opposite side walls of said case with a cavity between said two filter portion in communication with said outlet opening.

10. A filter according to claim 9, in which said filter means comprises a layer of porous filter material bent in the shape of an inverted U with two leg portions comprising said two filter portions lying respectively against said opposite side walls of said case and a curved top lying against said top of said case.

* * * * *